United States Patent
Bailey, Jr.

(10) Patent No.: US 8,165,135 B2
(45) Date of Patent: Apr. 24, 2012

(54) METHODS, COMPUTER NETWORKS, AND COMPUTER PROGRAM PRODUCTS THAT FACILITATE PROVIDING BROADBAND SERVICES WIRELESSLY TO THIRD PARTY USERS VIA A MESH NETWORK OF CUSTOMER PREMISE EQUIPMENT

(75) Inventor: Samuel Bailey, Jr., Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1609 days.

(21) Appl. No.: 11/418,908

(22) Filed: May 5, 2006

(65) Prior Publication Data

US 2007/0275699 A1 Nov. 29, 2007

(51) Int. Cl.
H04L 12/56 (2006.01)

(52) U.S. Cl. .................. 370/400; 455/13.1; 455/405

(58) Field of Classification Search .................. None
See application file for complete search history.

(56) References Cited

U.S. PATENT DOCUMENTS

| | | | | |
|---|---|---|---|---|
| 2002/0132619 | A1* | 9/2002 | Wiedeman et al. | 455/427 |
| 2004/0141484 | A1* | 7/2004 | Rogalski et al. | 370/338 |
| 2005/0190776 | A1* | 9/2005 | Hassan et al. | 370/401 |
| 2006/0018452 | A1* | 1/2006 | Stevens et al. | 379/207.07 |
| 2006/0031515 | A1* | 2/2006 | Van Gassel et al. | 709/227 |
| 2006/0146746 | A1* | 7/2006 | Kim | 370/328 |
| 2006/0146863 | A1* | 7/2006 | Spinar et al. | 370/449 |
| 2006/0171354 | A1* | 8/2006 | Tee et al. | 370/329 |
| 2006/0173978 | A1* | 8/2006 | Palm et al. | 709/220 |
| 2007/0053338 | A1* | 3/2007 | Sandhu et al. | 370/349 |
| 2007/0115933 | A1* | 5/2007 | Muhamed et al. | 370/352 |

* cited by examiner

Primary Examiner — Yong Zhou
(74) Attorney, Agent, or Firm — Guntin Meles & Gust, PLC; Ed Guntin

(57) ABSTRACT

Methods, computer networks, and computer program products that facilitate providing broadband service wirelessly to third party users via a mesh network of customer premise equipment are provided. A mesh network of customer premise equipment is connected to the central office of a broadband service provider. Each customer premise equipment includes a micro-internet service provider (MISP) platform configured to provide broadband service from the broadband service provider wirelessly to third party users. The broadband service provider rewards the customer premise equipment owners based on broadband service usage by third party users. The mesh network is configured to distribute third party user traffic across multiple customer premise equipment in the mesh network and reassemble the distributed traffic at the central office so as to optimize use of idle customer premise equipment bandwidth.

19 Claims, 2 Drawing Sheets

METHODS, COMPUTER NETWORKS, AND COMPUTER PROGRAM PRODUCTS THAT FACILITATE PROVIDING BROADBAND SERVICES WIRELESSLY TO THIRD PARTY USERS VIA A MESH NETWORK OF CUSTOMER PREMISE EQUIPMENT

FIELD OF THE INVENTION

The present invention relates generally to telecommunications and, more particularly, to telecommunications methods, computer networks, and computer program products for providing broadband services.

BACKGROUND OF THE INVENTION

Landline-based telecommunications services have been available to customers for more than 100 years. However, rural areas still exist in the United States and other parts of the world where landline-based services are unavailable. The primary reason for this is that the number of potential customers in these areas does not justify the cost of providing and maintaining landline-based services. Similarly, cellular communications services are unavailable in some rural areas because of the lack of cellular communications towers and other infrastructure. Again, the primary reason for the lack of towers and other infrastructure is that the number of potential customers in these areas does not justify the cost of providing and maintaining towers and infrastructure.

The lack of telecommunications services deprives people in these areas from accessing the Internet. There have been several attempts by various government agencies and communities to entice telecommunications service providers to provide telecommunications services in these areas. Unfortunately, these efforts have been generally unsuccessful and may actually delay new product growth and revenue generation for telecommunications companies.

Moreover, there are areas in the United States and other parts of the world where there has been an erosion of landline-based services as a result of competition from providers of wireless, satellite and cable telecommunications services. The availability of wireless, satellite and cable telecommunications services provides customers with additional service choices and is driving down the cost to the customer of telecommunications services. Also, the need for multiple landlines has diminished because Internet connectivity can be provided without blocking access to dial tone. Unfortunately, efforts by landline telecommunications service providers to stem the erosion of numbers of landlines and landline telecommunications services have been somewhat unsuccessful. Currently, strategies by landline telecommunications service providers are focused on adding application and service bundles to retain customers, which does not address customers whose primary focus remains cost, availability and flexibility.

Broadband services available via telecommunications systems enable rapid download of documents via email, hypertext transfer protocol (HTTP) and file transmission protocol (FTP). Future broadband services will include interactive near real time products, including voice, entertainment, gaming and information services. These new services will require roaming capability to enable ubiquitous service. If a broadband service is interrupted or unavailable in a certain location, a loss of revenue will likely result. Unfortunately, affordable wireless broadband service in some areas is not available. As such, this lack of availability may delay the adoption of higher value services and revenues.

SUMMARY OF THE INVENTION

In view of the above discussion, methods, computer networks, and computer program products that facilitate providing broadband service wirelessly to third party users via a mesh network of customer premise equipment are provided. According to some embodiments of the present invention, micro-internet service provider (MISP) platform includes customer premise equipment connected to a broadband service provider (e.g., connected wirelessly or via a landline connection) and that is configured to provide broadband service from the broadband service provider wirelessly to third party users. The MISP platform provides broadband services wirelessly via any of various wireless protocols including, but not limited to, Bluetooth protocol, WiFi protocol, and WiMax protocol. The MISP platform logs broadband service usage by third party users and provides this information to the broadband service provider.

According to some embodiments of the present invention, a telecommunications network includes a central office of a broadband service provider, and a mesh network of customer premise equipment connected to the central office. Each customer premise equipment includes a MISP platform configured to provide broadband service from the broadband service provider wirelessly to third party users. The broadband service provider rewards the customer premise equipment owners based on broadband service usage by third party users. The mesh network is configured to distribute third party user traffic across multiple customer premise equipment in the mesh network and reassemble the distributed traffic at the central office so as to optimize use of idle customer premise equipment bandwidth.

Other methods, computer networks, and computer program products according to embodiments of the invention will be or become apparent to one with skill in the art upon review of the following drawings and detailed description. It is intended that all such additional methods, computer networks, and computer program products be included within this description, be within the scope of the present invention, and be protected by the accompanying claims.

DETAILED DESCRIPTION OF THE INVENTION

Figure 1:
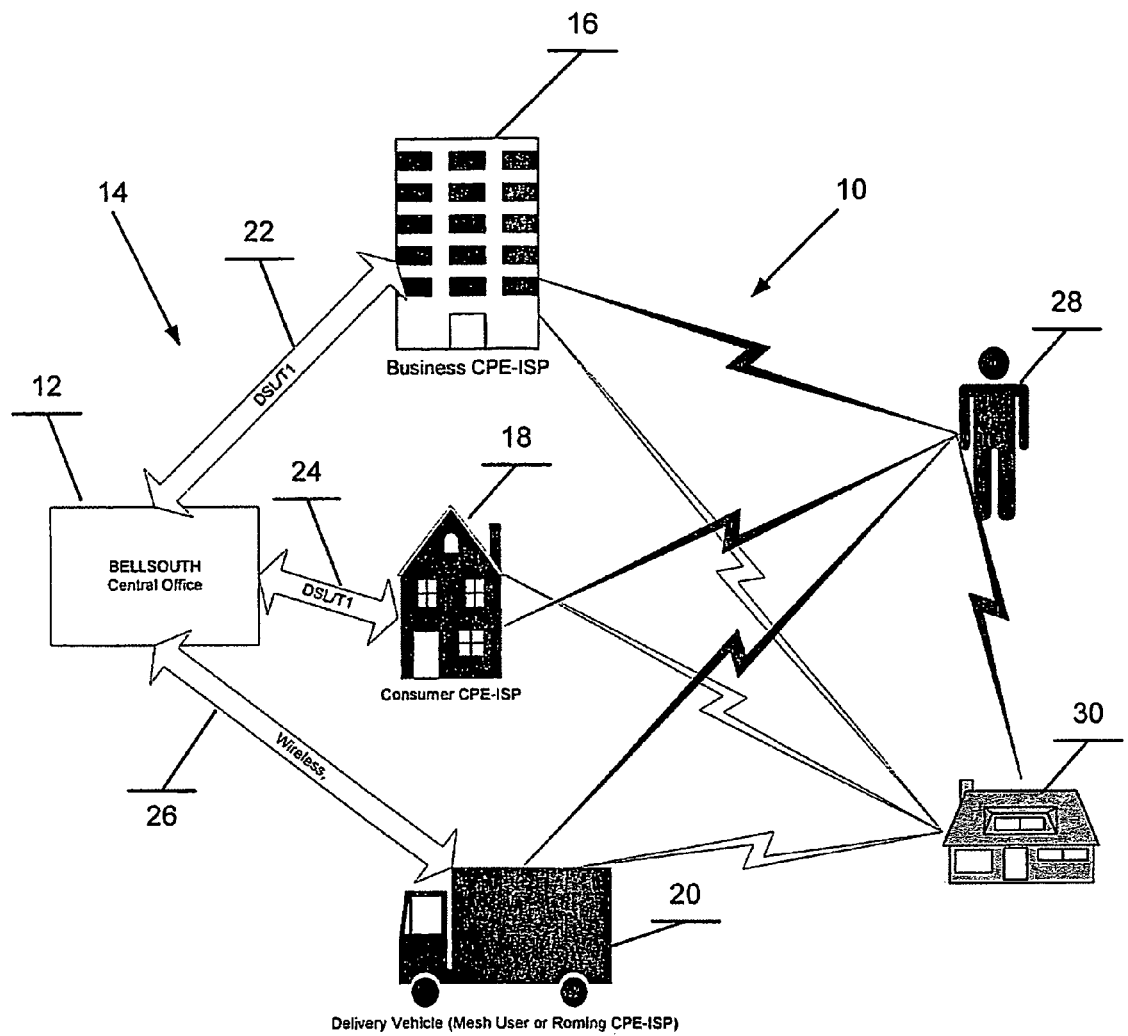
FIG. 1 is a block diagram that illustrates a mesh network of customer premise equipment, according to some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another.

The present invention may be embodied as methods, computer networks, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, computer networks, and/or computer program products, in accordance with embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computing device (such as a computer or other programmable data processing apparatus) to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to embodiments of the present invention, existing customers of a broadband service provider are allowed to convert their customer premise equipment to become part of a cooperative mesh network that simulates a micro-internet service provider (MISP) platform. The MISP platform allows a customer to use the wire-line connection to the broadband service provider as a backhaul for wireless services that could be shared by drive-by or stationary customers in a region via wireless protocol, e.g., Bluetooth, WiFi, WiMax, etc. Embodiments of the present invention provide motivation for customers not only to retain landlines, but to also increase the number of landlines, and/or increase bandwidth as adoption and use by third party users increases.

Referring to FIG. 1, a telecommunications network 10 of customer premise equipment, according to some embodiments of the present invention, is illustrated. The illustrated telecommunications network 10 includes a central office of a broadband service provider 12, and a mesh network 14 of customer premise equipment 16, 18, 20 connected to the central office 12. The customer premise equipment 16, 18, 20 is configured to provide broadband service from the broadband service provider wirelessly to third party users 28, 30. The broadband service provider rewards the customer premise equipment owners based on broadband service usage by third party users.

As used herein, the term "customer premise equipment" refers to any device capable of communicating with a central office and receiving broadband service therefrom. Exemplary customer premise equipment includes, but is not limited to, desktop computers, workstations, handheld devices such as a personal digital assistant (PDAs), etc. However, embodiments of the present invention are not limited to a particular user device that serves as customer premise equipment.

Customer premise equipment connected to a mesh network, according to embodiments of the present invention, may be connected to the central office 12 via a landline connection or via a wireless connection. In the illustrated embodiment of FIG. 1, customer premise equipment 16 and 18 are connected to the central office 12 via respective landline connections 22,24. Customer premise equipment 20 is mobile and is connected to the central office 12 via a wireless connection 20.

Third party users, according to some embodiments of the present invention, may be stationary users and/or mobile/drive-by users. For example, as illustrated in FIG. 1, third party user 28 is a mobile or drive-by user and third party user 30 is a stationary user.

Customer premise equipment in the mesh network 14 is configured to provide broadband service to third party users via any wireless protocol. Exemplary wireless protocols include, but are not limited to, Bluetooth protocol, WiFi protocol, and WiMax protocol. Bluetooth, WiFi, and WiMax protocols are well understood by those skilled in the art of the present invention and need not be described further herein.

According to some embodiments of the present invention, the mesh network 14 is configured to distribute third party user traffic across multiple customer premise equipment 16,18,20 and reassemble the distributed traffic at the central office 12 in order to optimize use of idle customer premise equipment bandwidth. The quality of service (QOS) relies on the mesh network of multiple MISP platforms to provide simultaneous access to broadband services. Broadband service traffic can be dynamically distributed in fractions across the multiple MISP platforms and reassembled at a central router, according to some embodiments of the present invention. This can optimize the use of idle bandwidth in a more efficient manner and can increase wireless network speeds significantly. As a mobile/drive-by or stationary third party user utilizes a customer's MISP platform, the traffic load is logged for accounting and reconciliation based on level of use of the customer's access point.

According to embodiments of the present invention, a broadband service provider provides mesh network access, billing and reconciliation services. For example, each third party user accessing broadband services via a MISP platform would need credentials and an account for access. In addition, each third party user will need client software to provide security, VoIP (Voice over IP), email, etc.

According to some embodiments of the present invention, there may be instances where a MISP platform enables voice service when conventional service, for example GSM (Global System for Mobile communication), is not available. The broadband service provider customer that is in a rural area could receive enough credits to justify adding one or more landlines or wireless antenna to increase the available bandwidth if saturation increases. Thus, embodiments of the present invention create motivation for customers to establish wireless access points, while including broadband service providers as a logistics hub for maintaining payoffs and equilibrium of the system.

Figure 2:
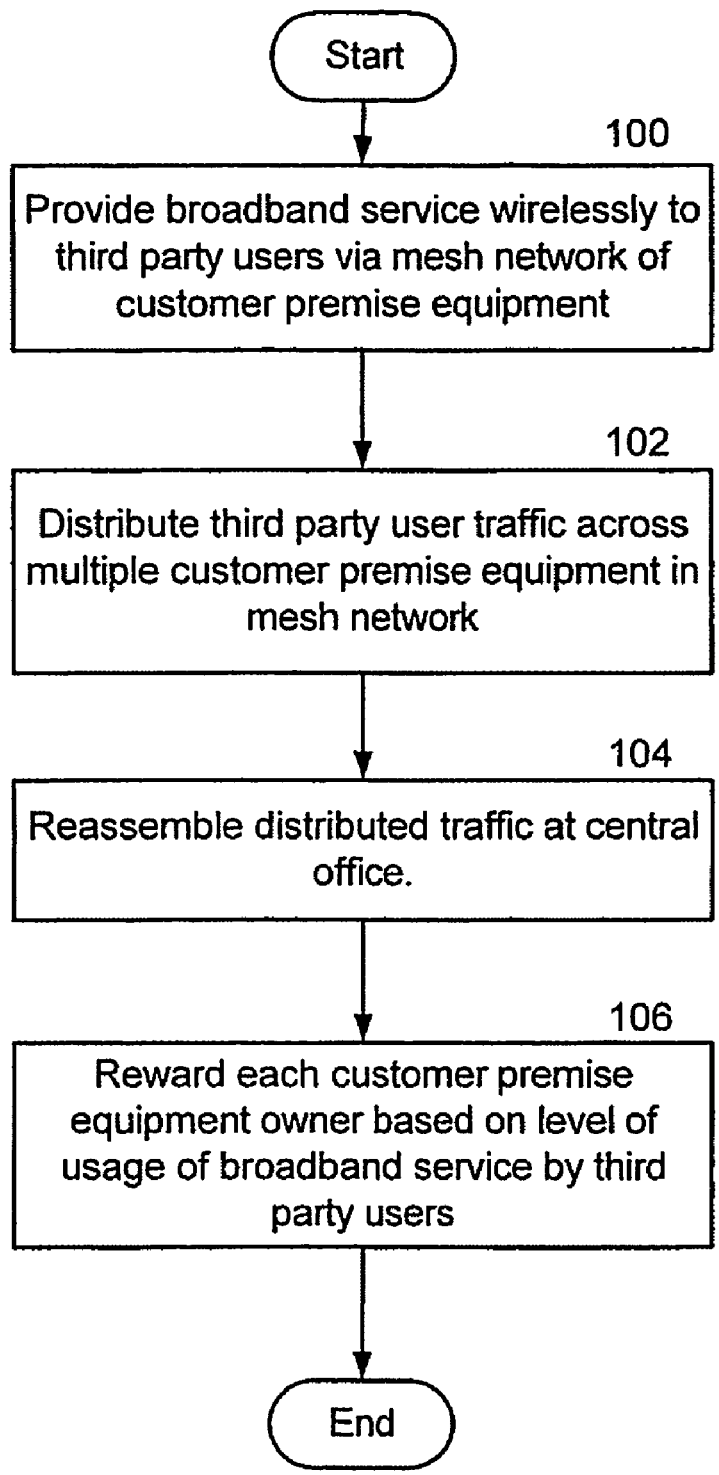
FIG. 2 is a flow chart of operations for providing broadband service to third party users via the a mesh network of customer premise equipment, in accordance with some embodiments of the present invention.

The flowchart of FIG. 2 illustrates the architecture, functionality, and operations of some embodiments of methods, computer networks, and computer program products for extending broadband service to third party users. In this regard, each block in the flow chart represents a module, segment, or portion of code, which comprises one or more executable instructions for implementing the specified logical function(s). It should also be noted that in other implementations, the function(s) noted in the blocks may occur out of the order described with respect to FIG. 2.

According to embodiments of the present invention, existing customers of a broadband service provider provide broadband service wirelessly to third party users via a mesh network of customer premise equipment (Block 100). The broadband service provider distributes third party user traffic across multiple customer premise equipment in the mesh network (Block 102) and reassembles the distributed traffic at a central office (Block 104). The broadband service provider rewards each customer premise equipment owner in the mesh network based on the level of usage of broadband service by third party users (Block 106).

Computer program code for carrying out operations of FIG. 2 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

EXAMPLE

Existing broadband service provider customer P1 has a DSL connection with broadband service provider. P1 is located 20 miles outside of Atlanta. P1 has a neighbor, P2, that is located greater than 20 miles from Atlanta and cannot obtain access from the broadband service provider because the DSL service cannot extend greater than 20 miles. A mesh network is extended to customer P2 from customer P1 via P1's customer premise equipment. Once this is achieved, customers P1 and P2 could provide service to P(N) third party users as the mesh network grows. The payoffs would be calculated by the broadband service provider based on current market rates for network access, cost and margins that would resemble a commodity market. Customers and third party users would share in the cost and profits of an available payout for a region. Each customer MISP platform has the potential to generate revenue, credits or pay a nominal fee if they participate in services offered by the broadband service provider. The payoff for the broadband service provider is access to more customers, retention of existing landline customers, and the capability to deliver broadband services in markets not heretofore available.

Many variations and modifications can be made to the preferred embodiments without substantially departing from the principles of the present invention. All such variations and modifications are intended to be included herein within the scope of the present invention, as set forth in the following claims.

That which is claimed is:

1. A micro-internet service provider platform, comprising:
customer premise equipment configurable to connect via a mesh network to broadband service provider equipment of a broadband service provider,
wherein the customer premise equipment is configured to provide broadband service from the broadband service provider equipment wirelessly to third party devices,
wherein the mesh network is configured to distribute data traffic generated by the third party devices across a plurality of customer premise equipment that includes the customer premise equipment of the micro-internet service provider platform,
wherein the mesh network reassembles the distributed traffic at the broadband service equipment, wherein access to the plurality of customer premise equipment is provided simultaneously to achieve a desired quality of service, wherein owners of the customer premise equipment and users of the third party devices are different parties each procuring broadband services of the broadband service provider, wherein the customer premise equipment logs broadband service usage information of each of the third party devices and provides the broadband service usage information to the broadband service provider equipment, and wherein the broadband service provider rewards the owner of the customer premise equipment and imposes a charge on each user of the third party devices based on broadband service usage information received by the broadband service provider equipment.

2. The micro-internet service provider platform of claim 1, wherein the customer premise equipment of the micro-internet service provider platform provides broadband services wirelessly via a protocol selected from the group comprising a Bluetooth protocol, a wireless fidelity protocol, and a world interoperability for microwave protocol.

3. The micro-internet service provider platform of claim 1, wherein the customer premise equipment of the micro-internet service provider platform is configured to receive a portion of data traffic generated by the third party devices, while other portions of the data traffic generated by the third party devices are received by other customer premise equipment of the plurality of customer premise equipment in the mesh network.

4. The micro-internet service provider platform of claim 1, wherein the customer premise equipment of the micro-internet service provider platform is connected to the mesh network via a land line connection.

5. The micro-internet service provider platform of claim 1, wherein the customer premise equipment of the micro-internet service provider platform is connected to the mesh network via a wireless connection.

6. A telecommunications network, comprising:
a central office of a broadband service provider, wherein the central office comprises broadband service equipment; and
a mesh network that connects a plurality of customer premise equipment to the broadband service equipment of the central office,
wherein the plurality of customer premise equipment is configured to provide broadband service from the broadband service equipment wirelessly to third party devices,
wherein owners of the plurality of customer premise equipment and users of the third party devices are different parties each procuring broadband services of the broadband service provider,
wherein the mesh network is configured to distribute data traffic generated by the third party devices across the plurality of customer premise equipment in the mesh network and reassemble the distributed traffic at the broadband service equipment of the central office,
wherein access to the plurality of customer premise equipment is provided simultaneously to achieve a desired quality of service, and
wherein the broadband service provider rewards the owners of the customer premise equipment and imposes a charge on each user of the third party devices based on broadband service usage by third party devices.

7. The telecommunications network of claim 6, wherein the mesh network is configured to distribute data traffic generated by the third party devices across the plurality of customer premise equipment in the mesh network in a manner that improves usage of idle customer premise equipment bandwidth.

8. The telecommunications network of claim 6, wherein the plurality of customer premise equipment is connected to the mesh network via a land line connection.

9. The telecommunications network of claim 6, wherein the plurality of customer premise equipment is connected to the mesh network via a wireless connection.

10. The telecommunications network of claim 6, wherein the plurality of customer premise equipment in the mesh network is configured to provide broadband service to the third party devices via a wireless protocol selected from the group comprising a Bluetooth protocol, a wireless fidelity protocol, and a world interoperability for microwave protocol.

11. The telecommunications network of claim 6, wherein the third party devices comprise at least one of stationary devices, or transitory devices, or both.

12. The telecommunications network of claim 6, wherein at least one of the plurality of customer premise equipment comprises a mobile customer premise equipment.

13. A method, comprising:
providing broadband service wirelessly to third party devices via a mesh network of a plurality of customer premise equipment, wherein owners of the plurality customer premise equipment and users of the third party devices are different parties each procuring broadband services of the broadband service provider:
distributing at the mesh network data traffic generated by the third party devices across the plurality of customer premise equipment to achieve a desired quality of service; and
rewarding the owners of the plurality of customer premise equipment and imposing a charge on each user of the third party devices based on a level of usage of broadband service usage by the third party devices via a corresponding one or more of the plurality of customer premise equipment.

14. The method of claim 13, wherein the mesh network reassembles the distributed traffic at communication equipment of the central office.

15. The method of claim 13, comprising distributing data traffic generated by the third party devices across the plurality of customer premise equipment in the mesh network in a manner that improves usage of idle customer premise equipment bandwidth.

16. The method of claim 13, wherein the plurality of customer premise equipment is connected to the mesh network via one of a land line connection, or a wireless connection, or combinations thereof.

17. The method of claim 13, wherein the plurality of customer premise equipment in the mesh network is configured to provide broadband service to the third party devices via a wireless protocol selected from the group comprising a Bluetooth protocol, a wireless fidelity protocol, and a world interoperability for microwave protocol, and wherein the third party devices are one of stationary devices or mobile devices.

18. The method of claim 13, wherein at least one of the plurality of customer premise equipment comprises a mobile customer premise equipment.

19. A non-transitory computer-readable storage medium comprising computer instructions, which when executed by at least one processor, causes the at least one processor to:
- provide broadband service wirelessly to third party devices via a mesh network of a plurality of customer premise equipment, wherein owners of the plurality of customer premise equipment and users of the third party devices are different parties each procuring broadband services of a broadband service provider;
- distribute at the mesh network data traffic generated by the third party devices across the plurality of customer premise equipment to achieve a desired quality of service;
- submit a reward to the owners of each customer premise equipment based on a level of usage of broadband service by the third party devices; and
- submit a charge to each user of the third party devices based on a level of usage of broadband service by the third party devices via one or more of the plurality of customer premise equipment.

* * * * *